United States Patent [19]

Spierings et al.

[11] Patent Number: 4,666,871
[45] Date of Patent: May 19, 1987

[54] GLASS COMPOSITION SUITABLE FOR USE IN A FLUORESCENT LAMP, TUBE AND LAMP ENVELOPE MANUFACTURED FROM SAID GLASS COMPOSITION, AND FLUORESCENT LAMP HAVING A LAMP ENVELOPE MANUFACTURED FROM SAID GLASS COMPOSITION

[75] Inventors: Gijsbertus A. C. M. Spierings; Eddy F. C. Van Hove, both of Eindhoven, Netherlands

[73] Assignee: U.S. Philips Corporation, New York, N.Y.

[21] Appl. No.: 681,465

[22] Filed: Dec. 14, 1984

[30] Foreign Application Priority Data

Dec. 20, 1983 [NL] Netherlands ............ 8304361

[51] Int. Cl.[4] ............... G03C 3/10
[52] U.S. Cl. .................. 501/67; 501/70;
501/64; 501/61; 501/62; 501/75; 501/77;
501/78; 313/636; 313/493
[58] Field of Search ........ 501/67, 70, 64, 61,
501/75, 77, 78; 313/636, 493

[56] References Cited

U.S. PATENT DOCUMENTS

| | | | |
|---|---|---|---|
| 3,563,772 | 2/1971 | Joormann et al. | 501/70 |
| 3,858,964 | 1/1975 | Piesslinger et al. | 501/70 |
| 4,036,654 | 7/1977 | Yale et al. | 501/67 |
| 4,179,300 | 12/1979 | Sagara | 501/72 |
| 4,390,638 | 6/1983 | Mennemann et al. | 501/77 |
| 4,459,510 | 7/1984 | Joormann | 501/70 |
| 4,520,115 | 5/1985 | Speit et al. | 501/60 |

FOREIGN PATENT DOCUMENTS

| | | | |
|---|---|---|---|
| 146188 | 6/1985 | European Pat. Off. | 501/61 |
| 3046594 | 9/1981 | Fed. Rep. of Germany . | |
| 50-26815 | 3/1975 | Japan | 501/70 |
| 5215 | 1/1978 | Japan . | |
| 774009 | 5/1957 | United Kingdom | 501/61 |

OTHER PUBLICATIONS

Chem. Abstract 94: 144244w "Glass Suitable for Glass Beads", Jpn. Kobai Tokkyo Koho, 80,126,547, 9-80.
Chem. Abstract 89: 29553f "Glass Compositions Useful As Dielectric Substance", Japan Kokai, 70,05215, 1-78.

Primary Examiner—William R. Dixon, Jr.
Assistant Examiner—A. Knab
Attorney, Agent, or Firm—Norman N. Spain

[57] ABSTRACT

A new type of glass, for example for use as a TL-envelope glass which as regards phosphor poisoning and Hg penetration has better properties than the present TL-envelope glasses. Phosphor poisoning occurs in particular upon fusing electrodes and bending and severing and bridging, respectively, during the manufacture of SL and PL lamps.

Phosphor poisoning is controlled by incorporating little or no $Na_2O$ in the glass. In order to nevertheless reach good processing properties, a combination of $Li_2O$ and $K_2O$ is used in the glass. The addition of only $Li_2O$ or only $K_2O$ does not result in a suitable glass.

Hg penetration is controlled by the presence of a large quantity of alkaline earth metal oxides in the glass.

The glass according to the invention has a good light transmission. A lamp comprising a lamp envelope of a glass according to the invention shows only a small luminous decline during operation of the lamp.

3 Claims, 1 Drawing Figure

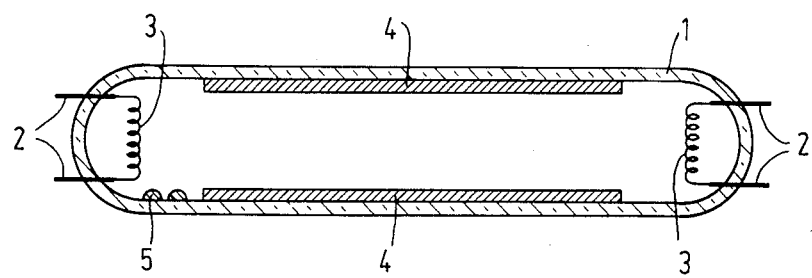

GLASS COMPOSITION SUITABLE FOR USE IN A FLUORESCENT LAMP, TUBE AND LAMP ENVELOPE MANUFACTURED FROM SAID GLASS COMPOSITION, AND FLUORESCENT LAMP HAVING A LAMP ENVELOPE MANUFACTURED FROM SAID GLASS COMPOSITION

The invention relates to a glass composition which comprises silicon dioxide, boron oxide, aluminium oxide, calcium oxide, barium oxide and at least one alkali metal oxide.

The invention further relates to a tube manufactured from such a glass composition.

The invention also relates to a lamp envelope manufactured from the above-mentioned glass composition.

The invention also relates to a fluorescent lamp comprising a vacuum-tight sealed glass lamp envelope in which two electrodes connected to current supply wires are provided between which a discharge takes place during operation of the lamp, the lamp envelope being filled with a gas atmosphere and a metal which during operation of the lamp at least partly evaporates, a layer comprising at least one phosphor being provided on the inside of the wall of the lamp envelope. The invention relates more particularly to a fluorescent lamp in which the metal which during operation of the lamp at least partly evaporates is mercury.

In German published Patent Application DE 3046594, a glass composition is described which is suitable for use in a lamp which is filled with a gas atmosphere and a metal which during operation of the lamp at least partly evaporates, which glass composition comprises $SiO_2$, $B_2O_3$, $Al_2O_3$, CaO and BaO and which glass composition may in addition comprise $ZrO_2$, MgO and SrO. The glass composition moreover contains 2–8 mol% $Na_2O$. It has been found experimentally that the $Na_2O$ may not be replaced entirely or partly by $Li_2O$ because phase separation may occur in the glass during the processing thereof. When the $Na_2O$ is replaced fully or partly by $K_2O$, crystallisation occurs in the glass. The presence of at least one alkali metal oxide is desired to reach a good processability of the glass.

During the manufacture of a lamp as described above, for example, during sealing and further shaping, the temperature of the glass of the lamp envelope is strongly increased locally, for example to above 600° C. When such a lamp has a phosphor layer on the inside of the wall of the lamp envelope, a contamination of the phosphor occurs with sodium from the glass of the lamp envelope. As a result of this, the initial luminous efficiency of the phosphor is reduced. The luminous efficiency of the phosphor during operation of the lamp also decreases further in the course of time.

It is an object of the invention to provide a fluorescent lamp and a glass composition suitable for use in a lamp envelope for such a lamp in which the lamp has a high luminous efficiency which decreases only little with time during operation of the lamp. For that purpose the mobility of the sodium in the glass can be restricted but it is most efficacious to use a glass which contains little or no sodium oxide.

Another object of the invention is to provide a mercury vapour fluorescent lamp and a glass composition suitable for use in a lamp envelope for such a lamp in which the lamp has a luminous efficiency which decreases little with time during operation of the lamp. In order to prevent reduction of the light transmission of the glass (greying), it is desired for the glass to withstand penetration of mercury.

According to the invention, both objects are achieved by a glass composition which consists of 40–50 mol.% $SiO_2$; 3–6 mol.% $B_2O_3$; 0–5 mol.% PbO, 1–3 mol.% $Li_2O$; 0–2 mol.% $Na_2O$; 1–7 mol.% $K_2O$; 5–15 mol.% CaO; 0–10 mol.% MgO; 5–30 mol.% BaO; 0–0.5 mol.% $CeO_2$; 3–6 mol.% $ZrO_2$ and 3–6 mol.% $Al_2O_3$, the sum of the quantities of $ZrO_2$ and $Al_2O_3$ being 5–10 mol.%, the sum of the quantities of the alkali metal oxides being 4–10 mol.% and the sum of the quantity of PbO and the total quantity of the alkaline earth metal oxides including MgO, being 27–37 mol.%.

The invention is based on the surprising experimental fact that a glass composition as described above which contains both $Li_2O$ and $K_2O$ has good processing properties and its usefulness is not reduced by phase separation or crystallisation in the glass, which phenomena do occur when $Na_2O$ is replaced fully or partly by $Li_2O$ or by $K_2O$ alone.

The penetration of Hg is controlled by the large content of alkaline earth metal oxides in the glass. When the refractory material of the furnace in which the glass is fused, comprises $ZrO_2$, it is efficacious to choose the quantity of BaO in the glass to be not too large and to use, for example, CaO and MgO to thus prevent attack of the refractory material of the furnace PbO may also serve partly as a replacement for BaO while maintaining the good processing properties of the glass according to the invention.

In order to reach a good light transmission of the glass the quantity of iron oxide in the glass must be small, for example, less than 250 ppm. Said iron oxide is usually present in small quantities in the starting materials from which the glass is prepared. By the addition of $CeO_2$ (for example, 0.25 mol.%) to the glass, the possibly any ferrous oxide present is oxidized to ferric oxide, as a result of which the light absorption moves to wavelengths beyond the visible range.

The invention will be described in greater detail with reference to a few examples and a drawing the sole FIGURE of which is a longitudinal section of an embodiment of a lamp according to the invention, in this case a mercury vapour discharge lamp.

The FIGURE shows a lamp comprising a vacuum-tight sealed lamp envelope 1. Current supply wires 2 which are connected to electrodes 3 are provided through the wall of the lamp envelope 1. In the embodiment shown the electrodes are coiled filaments but any further known embodiment of the electrodes is also suitable. A layer of a phosphor 4 is present on the inside of the wall of the lamp envelope 1. Some metallic mercury 5 which after ignition of the lamp evaporates is present within the lamp envelope 1. Before use such a lamp is filled, for example, with a gas mixture of 99% by volume of Ne and 1% by volume of Ar at a total pressure of 730 Pa.

A few glass compositions were fused with compositions as indicated in the table hereinafter. The fusion of said glass was carried out in a platinum crucible in an electric furnace. Starting materials were silica, boric acid, aluminium oxide, zirconiumdioxide, cerium oxide, lead oxide and the carbonates of calcium, barium, magnesium, lithium, sodium and potassium (in so far as these metals were present in the examples). During fusion and further processing no particular problems occurred.

Lamps having lamp envelopes manufactured from glasses having one of the compositions defined in the table have a good luminous efficiency and a long life. Measurement of the Hg content of the glass after 600 and 1600 hours operation of the lamp demonstrated that the Hg content was a factor 2 to 3 lower than after the same period in use of prior art lamps. After 2000 hours in operation, no discoloration of the glass of the lamp occurred.

Composition II in the table is a preferably used composition for use as a glass for a lamp envelope in a mercury vapour fluorescent lamp in which requirements are imposed both as regards the resistance of the glass against attack by Hg and as regards the resistance of the phosphor against poisoning by the glass. After 5000 hours in operation the luminous efficiency of the phosphor of the lamp has not decreased to less than 98% of the initial value while in prior art lamps it decreases in the same period of time to 80% of the initial value.

TABLE

|  | Composition in mole % | | | | Composition in weight % | | | |
| --- | --- | --- | --- | --- | --- | --- | --- | --- |
|  | I | II | III | IV | I | II | III | IV |
| $SiO_2$ | 44.75 | 44.75 | 44.75 | 42.25 | 32.5 | 34.5 | 30.9 | 28.2 |
| $B_2O_3$ | 5 | 5 | 5 | 5 | 4.2 | 4.5 | 4.0 | 3.9 |
| $ZrO_2$ | 5 | 5 | 5 | 5 | 7.4 | 7.9 | 7.1 | 6.9 |
| $Al_2O_3$ | 5 | 5 | 5 | 5 | 6.2 | 6.5 | 5.8 | 5.7 |
| $Li_2O$ | 2.5 | 2.5 | 2.5 | 1.5 | 0.9 | 1.0 | 0.9 | 0.5 |
| $Na_2O$ | — | — | — | 2 | — | — | — | 1.3 |
| $K_2O$ | 5 | 2.5 | 5 | 4 | 5.7 | 3.0 | 5.4 | 4.2 |
| CaO | 15 | 10 | 12.5 | 10 | 10.1 | 7.2 | 8.1 | 6.2 |
| BaO | 17.5 | 15 | 17.5 | 25 | 32.5 | 29.7 | 30.9 | 42.6 |
| MgO | — | 10 | — | — | — | 5.2 | — | — |
| PbO | — | — | 2.5 | — | — | — | 6.4 | — |
| $CeO_2$ | 0.25 | 0.25 | 0.25 | 0.25 | 0.5 | 0.5 | 0.5 | 0.5 |

What is claimed is:

1. A glass composition which comprises silicon dioxide, boron oxide, aluminium oxide, calcium oxide, barium oxide and at least one alkali metal oxide, characterized in that the glass composition consists of 40–50 mol.% $SiO_2$; 3–6 mol.% $B_2O_3$; 0–5 mol.% PbO; 1–3 mol.% $Li_2O$; 0–2 mol.% $Na_2O$; 1–7 mol.% $K_2O$; 5–15 mol.% CaO; 0–10 mol.% MgO; 5–30 mol.% BaO; 0–0.5 mol.% $CeO_2$; 3–6 mol.% $ZrO_2$ and 3–6 mol.% $Al_2O_3$, the sum of the quantities of $ZrO_2$ and $Al_2O_3$ being 5–10 mol.%, the sum of the quantities of the alkali metal oxides being 4–10 mol.% and the sum of the quantity of PbO and the total quantity of the alkaline earth metal oxides including MgO, being 27–37 mol.%.

2. A tube manufactured from a glass having a composition as claimed in claim 1.

3. A lamp envelope manufactured from a glass having a composition as claimed in claim 1.

* * * * *